Patented Aug. 17, 1937

2,090,537

UNITED STATES PATENT OFFICE 2,090,537

LECITHIN PRODUCT AND PROCESS

Albert A. Lund, Port Washington, N. Y.

No Drawing. Application November 10, 1936,
Serial No. 110,183

22 Claims. (Cl. 260—99.20)

The present application is a continuation in part of my co-pending application, Serial No. 39,997, filed September 10, 1935, which is in turn a continuation in part of my co-pending application, Serial No. 750,396, filed October 27, 1934 now abandoned.

This invention relates to fluid hydrates of lecithin and/or related phosphatides, and includes processes for preparing the same.

Lecithin as now commercially available, consists of an emulsion or mixture of phosphatides and fat or saturated solutions of these phosphatides in a parent vehicle, such as soya bean oil. Lecithin in such mixtures is unstable, and uniform and dependable results from use of these mixtures are difficult to attain. Lecithin in this form is unsplit and is insoluble in aqueous mediums. The oil or fat protecting menstruum further interferes with many other inherent characteristics and properties of the colloid. The present lecithin mixtures also contain decomposition products, such as oxidation and cleavage products of the oil and of the lecithin itself, which products further interfere with efficient use of the substance.

I have discovered a new physical state of vegetable lecithin wherein relatively high concentration of this substance may be obtained in a condition of true hydration. Lecithin in this condition avoids disadvantages attending prior art forms thereof for certain uses and permits many new uses of the substance not heretofore feasible.

The hydrated lecithin of my invention is of uniform composition and highly stable in form. It is readily diffusible with either oil or water or complex mixtures thereof, and enters immediately into colloidal solution in aqueous menstruums. Because of its great effect on surface tension (lecithin in the form of this hydrate exhibits the maximum effect) it is capable of intimately and thoroughly "wetting" finely divided solids, as powders, closely woven textiles, and the like. This novel lecithin product is further substantially devoid of oils and fats and decomposition products resulting from oxidation, cleavage, or the like.

According to this invention, the lecithin hydrate may be isolated or provided with a vehicle of water alone or water and a minor proportion of alcohol. Under the conditions of the process, there is no evidence that the water exercises a hydrolyzing action on the lecithin; on the contrary, the resulting hydrated lecithin has a higher degree of protection against changes in composition than in the prior art oil phase.

My method of producing lecithin in the novel form above described consists generally in providing a mixture of water, alcohol and a rich undecomposed oleaginous phosphatide mixture, such as the type known as 65% to 68% commercial lecithin in proportions lying approximately within the following ranges:

Commercial vegetable lecithin, 15 to 25%; alcohol, 8 to 25%; water 58 to 78%. The water and alcohol are preferably heated to in the neighborhood of 160° F. and the lecithin then added, followed by agitation. When a homogeneous mixture is obtained, it is allowed to come to natural equilibrium at substantially normal temperature. The desired equilibrium will be evidenced by the formation of the liquid mixture into three distinct layers of three liquid phases in equilibrium, essentially:—(1) excess oil saturated with lecithin and alcohol and water; (2) excess alcohol and water saturated with lecithin and oil, and (3) lecithin saturated with alcohol, water and oil.

The uppermost layer, or first phase, ordinarily comprises about 2½% to 5% of the total mixture and possesses useful properties as an emulsifying oil and is a valuable by-product of the process. The intermediate layer, or second phase, comprises usually about 24% to 28% of the mixture and may be re-used in the process either in place of, or in addition to the necessary water and alcohol. The bottom fraction, or third phase, contains the lecithin hydrate herein referred to and is a transparent reddish brown fluid of moderate viscosity. This fraction comprises the bulk of the mixture and contains in a high state of efficiency about three-fourths of the commercial lecithin originally introduced into the mixture.

The above described lecithin hydrate containing fraction may be used, if desired, without further treatment. The purity of the product, however, may be increased by subjecting the same to evaporation, preferably at reduced pressure, to evaporate off the alcohol and a portion of the water. Evaporation or purification may be carried to the point where the resulting product consists of alcohol-free hydrates substantially free of unbound moisture and may be described as lecithin hydrate having a vehicle of water. Experiments have shown that the efficiency of the unpurified hydrate containing fraction or alcoholic hydrate is ten times greater than the ordinary stabilized lecithin emulsions and the efficiency of the purified or alcohol-free hydrate is twenty times greater, varying to some extent, of course, depending upon the composition of the product in which the colloid is used.

The lecithin hydrate may, if desired, be isolated from its vehicle of water in a simple manner such as the following: The presence of salt-electrolytes in the water dispersed product keeps the phosphatide in the soluble form by peptization. Diminishing the amount of the salts present on neutralizing their charge by the introduction of hydrogen ions, such as addition of phosphoric acid, shrinks the volume of the lecithin containing phase by separating out the excess water. As the lowering of the pH is continued, the phosphatide is brought within a jellying range and in this state the product is a true hydrate of lecithin or hydrate of lecithin and its associated phosphatides in that all of the water is in the bound condition and there is no free moisture remaining.

The lecithin hydrate of the present invention as a gel may be susceptible to synersis. This tendency may be reduced in any well known manner, such as by employing sugar as a dehydrating agent in a manner similar to its use in pectin jellies, and thus it is possible to produce a solid lecithin or phosphatide hydrate jelly. The sugar further functions to act as a preservative in the recovered lecithin hydrate.

Because of variations in the composition of commercial vegetable lecithins, it may be found necessary in practice of the present process, to add small critical amounts of certain salts, and also small critical amounts of acid to adjust the hydrogen-ion concentration of the commercial vegetable lecithin mixture to a point at which separation will occur. Many salts may be used with varying efficiencies; those with monovalent cations and organic negative radicals being preferred as sodium acetate or sodium lactate. Many acids are suitable for use, but those too weakly acidic require large concentrations, relatively, while the strong ones are extremely critical as to concentration. Phosphoric acid may be used with good results. In cases where the addition of salt or acid, or both, is found necessary, either or both of these reagents are added in amounts varying up to an additional 2% of the original mixture.

The water and alcohol are preferably heated to in the neighborhood of 160° F., the lecithin then added, and then the salt or acid or both added, followed by agitation. When a homogeneous mixture is obtained, it is allowed to come to natural equilibrium at substantially normal temperature. The desired equilibrium will be evidenced by the formation of the liquid mixture into the distinct layers described previously.

In those cases where the addition of salt is necessary, the function of the salt is to furnish positively charged ions which will neutralize the charges upon the negatively charged colloidal lecithin particles. The neutralized particles may then, by the absorption of water, swell and coalesce to form the desired hydrate. The hydrogen ion in the acid will also perform this function, but the resulting lecithin hydrate is not as satisfactory for many applications. The purpose in adding the acid is to increase the efficiency of the salt-electrolyte by the critical adjustment of the hydrogen-ion concentration. A pH range of between 4.0 and 6.0 is necessary to obtain the useful properties in the final product, and preferably a range of between 4.5 and 6.0 should be maintained. Lowering the pH by the addition of acid lowers the amount of electrolyte which must be added, but excessive lowering much below 4.5, materially lowers the efficiency of the desired product.

The theory of action of the process of this invention is believed to be as follows:

The process at the beginning involves a four component system; water, alcohol, lecithin and oil. After the period of original mixing, these are all intimately and finely dispersed, and the lecithin saturated with oil or fat and fat saturated with lecithin.

Alcohol, in its critical minor proportion in water, first acts as a solvent, dissolving the fat and oil, leaving the lecithin in intimate contact with water. Lecithin is slightly soluble in both water and alcohol and these two solvents are probably nearly saturated with lecithin at this point. The remaining major portion of the lecithin remains in colloidal suspension in the water-alcohol solution. This colloidal suspension is peptized by the alcohol. The lecithin particles are negatively charged.

The lecithin in solution in the alcohol is in condition to become hydrated, and water dissolves in it causing the particles to swell. After this has happened, another increment of the lecithin dissolves in the alcohol, and the hydration process continues until all of the lecithin is hydrated. In this instance, the alcohol is functioning as a catalyst.

As previously stated, the lecithin particles are negatively charged. In those cases in which it is found necessary to add electrolytes to induce the system to separate into its final phases, the suspended particles of lecithin repell each other, and so are not able to assume their desired role as the external phase of the system lecithin-water. By the addition of critical amounts of positive ions, the neutralization of the charges on the lecithin in suspension is brought about. The lecithin particles are then enabled to "swell" by the absorption of water, and lesser amounts of oil and alcohol until they coalesce. The excess water and alcohol present being "squeezed out" from the gel.

Adjustment of the hydrogen-ion concentration is not necessary, but it has been found that it will speed up the above reactions, and increase the efficiency of the electrolyte.

Although all alcohols and hydroxyl compounds and related solvents that are miscible with water are suitable in various degrees in the above described process, I prefer to use commercial ethyl alcohol, or ethyl alcohol denatured with methyl alcohol because of their general acceptability in the food and beverage arts and industrial arts respectively. Iso-propyl alcohol is also particularly desirable as a lesser amount is required and evaporation is diminished. Anhydrous lecithin is equally as applicable in the foregoing process instead of the "commercial" lecithin recited, and appropriate minor adjustments in the proportions herein given may be made as found advisable. It is also possible to use crude phosphatide containing materials such as soya bean residues as the starting material instead of manufactured soya-lecithin.

Instead of allowing the mixture to spontaneously cool to normal temperature prior to effecting separation, it is often desirable, particularly in large batch commercial practice, to accelerate cooling by artificial means after the reaction is completed and then separate the cooled mixture into its component phases by gravity settling or centrifuge.

I claim:

1. Lecithin hydrate.

2. As a new composition of matter, hydrated vegetable lecithin having a vehicle of water.

3. As a new composition of matter, hydrated vegetable lecithin having a vehicle of water and alcohol.

4. As a new composition of matter, a free fluid hydrate of vegetable lecithin substantially devoid of oils and fats.

5. A new composition of matter comprising hyrated lecithin and a sugar preservative.

6. A process for producing lecithin hydrate which comprises providing a homogeneous mixture of water, alcohol and phosphatid containing material, and permitting reaction in the mixture to form lecithin hydrate.

7. A process for producing lecithin hydrate which comprises providing a homogeneous mixture of water, alcohol, phosphatid containing material, and a sugar dehydrating agent, and permitting reaction in the mixture to form lecithin hydrate.

8. A process for producing lecithin hydrate which comprises providing a homogeneous mixture of water, alcohol and phosphatid containing material, permitting reaction in the mixture to form a fraction composed of lecithin hydrate, water and alcohol, and separating the alcohol from said fraction.

9. A process for producing lecithin hydrate having a vehicle of water which comprises providing a homogeneous mixture of water, alcohol and commercial lecithin, permitting reaction in the mixture to form a fraction containing lecithin hydrate, water and alcohol, and separating the alcohol from said fraction.

10. A process for producing lecithin hydrate which comprises providing a homogeneous mixture of water, alcohol and commercial lecithin, and permitting spontaneous reaction in the mixture at normal temperatures to form lecithin hydrate.

11. A process of producing lecithin hydrate which comprises providing a homogeneous mixture of water, alcohol and commercial lecithin, permitting reaction in the mixture at normal temperatures to form successive layers containing lecithin hydrate, excess water and alcohol, and excess oil, and separately recovering said layers.

12. A process for producing lecithin hydrate which comprises providing a homogeneous mixture consisting of water 58% to 75%, alcohol 8% to 25% and commercial lecithin 15% to 25%, and permitting reaction in the mixture at normal temperatures to form lecithin hydrate.

13. A process for producing lecithin hydrate which comprises separating a substantial proportion of lecithin from a commercial lecithin oil mixture by solvent extraction, and reacting the separated lecithin with water to form lecithin hydrate.

14. A process for producing lecithin hydrate which comprises separating a substantial proportion of lecithin from a commercial lecithin oil mixture by solvent extraction, and reacting the separated lecithin with water in the presence of an alcohol to form lecithin hydrate.

15. A process for producing lecithin hydrate which comprises separating a substantial proportion of lecithin from a commercial lecithin oil mixture by solvent extraction with water and alcohol, and reacting the separated lecithin with said water in the presence of said alcohol to form lecithin hydrate.

16. A process for producing lecithin hydrate which comprises providing a homogeneous mixture consisting of water 58% to 75%, alcohol 8% to 25%, commercial lecithin 15% to 25% and an agent capable of neutralizing negatively charged lecithin, and permitting reaction in the mixture at normal temperatures to form lecithin hydrate.

17. A process for producing lecithin hydrate which comprises separating a substantial proportion of lecithin from a commercial lecithin oil mixture by solvent extraction, and reacting the separated lecithin with water in the presence of an alcohol and cations capable of neutralizing negatively charged lecithin to form lecithin hydrate.

18. The process for producing lecithin hydrate which comprises separating a substantial proportion of lecithin from a commercial lecithin oil mixture by solvent extraction with water and alcohol, reacting the separated lecithin with said water in the presence of said alcohol and cations capable of neutralizing negatively charged lecithin to form lecithin hydrate.

19. A process for producing lecithin hydrate which comprises providing a homogeneous mixture of water, alcohol, commercial lecithin, and an acid capable of lowering the hydrogen ion concentration and permitting spontaneous reaction in the mixture at normal temperatures to form lecithin hydrate.

20. A process for producing lecithin hydrate which comprises providing a homogeneous mixture of water, alcohol, commercial lecithin, and a salt capable of neutralizing negatively charged lecithin, and permitting spontaneous reaction in the mixture at normal temperatures to form lecithin hydrate.

21. A process for producing lecithin hydrate which comprises providing a homogeneous mixture of water, alcohol, commercial lecithin, a salt capable of neutralizing negatively charged lecithin, and an acid capable of lowering the hydrogen ion concentration, and permitting spontaneous reaction in the mixture at normal temperatures to form lecithin hydrate.

22. A process for producing lecithin hydrate which comprises providing a homogeneous mixture of water, alcohol and commercial lecithin, adjusting the hydrogen ion concentration to a pH value of between 4.0–6.0, and equilibrating the mixture by the addition of an electrolyte to form lecithin hydrate.

ALBERT A. LUND.